US010486372B2

(12) United States Patent
Joern

(10) Patent No.: US 10,486,372 B2
(45) Date of Patent: Nov. 26, 2019

(54) METHOD FOR INTEGRATING A BACKING-STRUCTURE ASSEMBLY IN A STRUCTURE OF AN AIRCRAFT OR SPACECRAFT

(71) Applicant: Airbus Operations GmbH, Hamburg (DE)

(72) Inventor: Paul Joern, Hamburg (DE)

(73) Assignee: Airbus Operations GmbH (DE)

( * ) Notice: Subject to any disclaimer, the term of this patent is extended or adjusted under 35 U.S.C. 154(b) by 12 days.

(21) Appl. No.: 15/613,608

(22) Filed: Jun. 5, 2017

(65) Prior Publication Data

US 2017/0355152 A1 Dec. 14, 2017

(30) Foreign Application Priority Data

Jun. 8, 2016 (DE) ........................ 10 2016 210 124

(51) Int. Cl.
*B32B 41/00* (2006.01)
*B29C 65/00* (2006.01)
(Continued)

(52) U.S. Cl.
CPC ............ *B29C 66/721* (2013.01); *B29C 65/02* (2013.01); *B29C 65/04* (2013.01); *B29C 66/0222* (2013.01); *B29C 66/112* (2013.01); *B29C 66/532* (2013.01); *B29C 66/61* (2013.01); *B29C 66/863* (2013.01); *B29C 70/345* (2013.01); *B29C 70/38* (2013.01); *B29C 70/386* (2013.01); *B29C 70/46* (2013.01); *B64C 1/068* (2013.01); *B64C 1/12* (2013.01); *B64F 5/10* (2017.01);
(Continued)

(58) Field of Classification Search
CPC ..... B29C 66/721; B29C 70/386; B29C 65/04; B29C 65/08; B29C 70/345; B29K 2071/00
USPC .................... 156/60, 64, 350, 351, 378, 379
See application file for complete search history.

(56) References Cited

U.S. PATENT DOCUMENTS

| 2010/0192376 A1 | 8/2010 | Frauen et al. |
| 2011/0156305 A1* | 6/2011 | Lonsdorfer ........... B29C 70/443 264/261 |

(Continued)

FOREIGN PATENT DOCUMENTS

| DE | 10 2007 028 918 A1 | 1/2009 |
| DE | 10 2013 110 684 A1 | 3/2015 |

(Continued)

*Primary Examiner* — Michael N Orlando
*Assistant Examiner* — Joshel Rivera
(74) *Attorney, Agent, or Firm* — Lerner, David, Littenberg, Krumholz & Mentlik, LLP

(57) ABSTRACT

A method for integrating a backing-structure assembly in a structure of an aircraft or spacecraft is described. In this case, a plurality of individual elements is joined to form the backing-structure assembly. The individual elements for the backing-structure assembly and a skin portion for the structure are provided. The elements are arranged on a pre-assembly device which comprises retaining devices, which are each configured to hold one of the elements so as to be adjustable with respect to the position and/or location thereof. Some or all of the elements are connected to the skin portion. In the method, by adjusting the retaining devices for tolerance compensation, gaps between joint regions of the elements and the skin portion are eliminated or adjusted.

20 Claims, 6 Drawing Sheets

(51) Int. Cl.
    *B29C 65/04*    (2006.01)
    *B29C 70/34*    (2006.01)
    *B29C 70/38*    (2006.01)
    *B29C 65/02*    (2006.01)
    *B64C 1/12*    (2006.01)
    *B29C 70/46*    (2006.01)
    *B64C 1/06*    (2006.01)
    *B64F 5/10*    (2017.01)
    *B29C 65/08*    (2006.01)
    *B29K 71/00*    (2006.01)
    *B29C 65/16*    (2006.01)
    *B29C 65/18*    (2006.01)
    *B29C 65/26*    (2006.01)
    *B29C 65/30*    (2006.01)
    *B29C 65/36*    (2006.01)
    *B29L 31/30*    (2006.01)

(52) U.S. Cl.
    CPC .............. *B29C 65/08* (2013.01); *B29C 65/16* (2013.01); *B29C 65/18* (2013.01); *B29C 65/26* (2013.01); *B29C 65/305* (2013.01); *B29C 65/36* (2013.01); *B29C 66/71* (2013.01); *B29C 66/7212* (2013.01); *B29C 66/72141* (2013.01); *B29C 66/81455* (2013.01); *B29C 66/8362* (2013.01); *B29K 2071/00* (2013.01); *B29L 2031/3082* (2013.01); *Y02T 50/43* (2013.01)

(56) References Cited

U.S. PATENT DOCUMENTS

| | | |
|---|---|---|
| 2015/0083860 A1 | 3/2015 | Frauen et al. |
| 2016/0101576 A1 | 4/2016 | Joern |

FOREIGN PATENT DOCUMENTS

| | | |
|---|---|---|
| DE | 10 2013 218 520 A1 | 3/2015 |
| DE | 10 2014 113 663 A1 | 3/2016 |
| DE | 10 2010 062 870 B4 | 11/2016 |

* cited by examiner

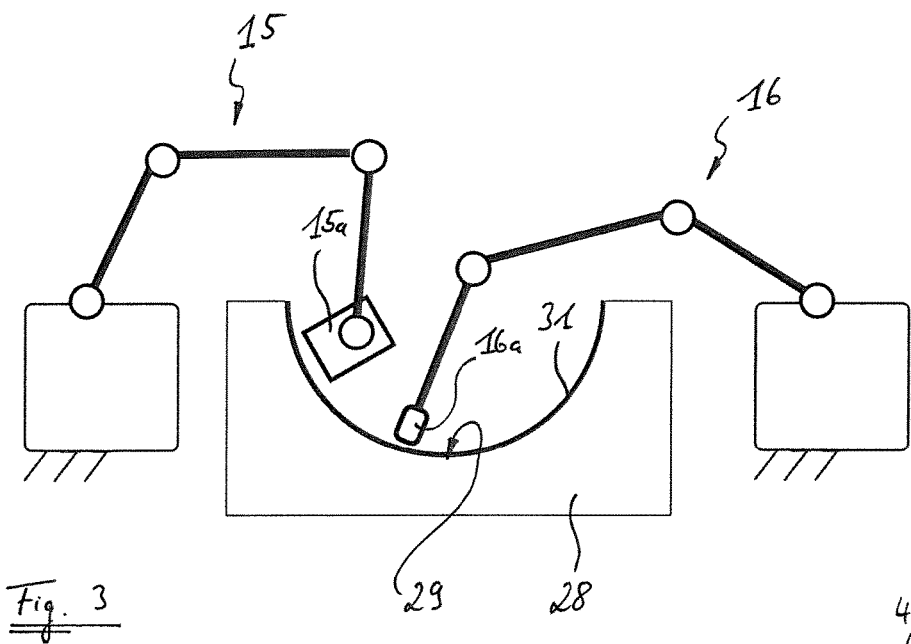
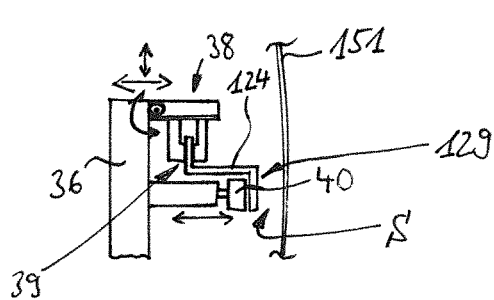
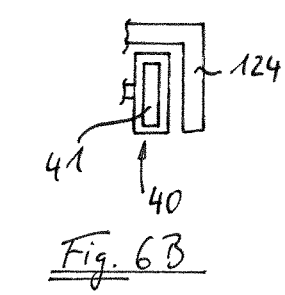
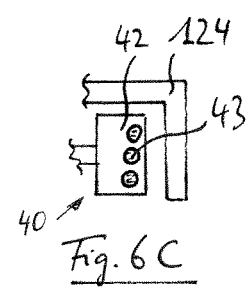
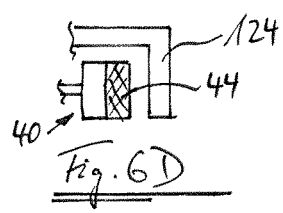
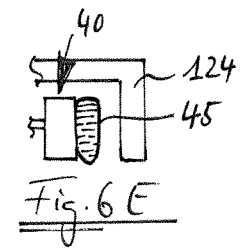

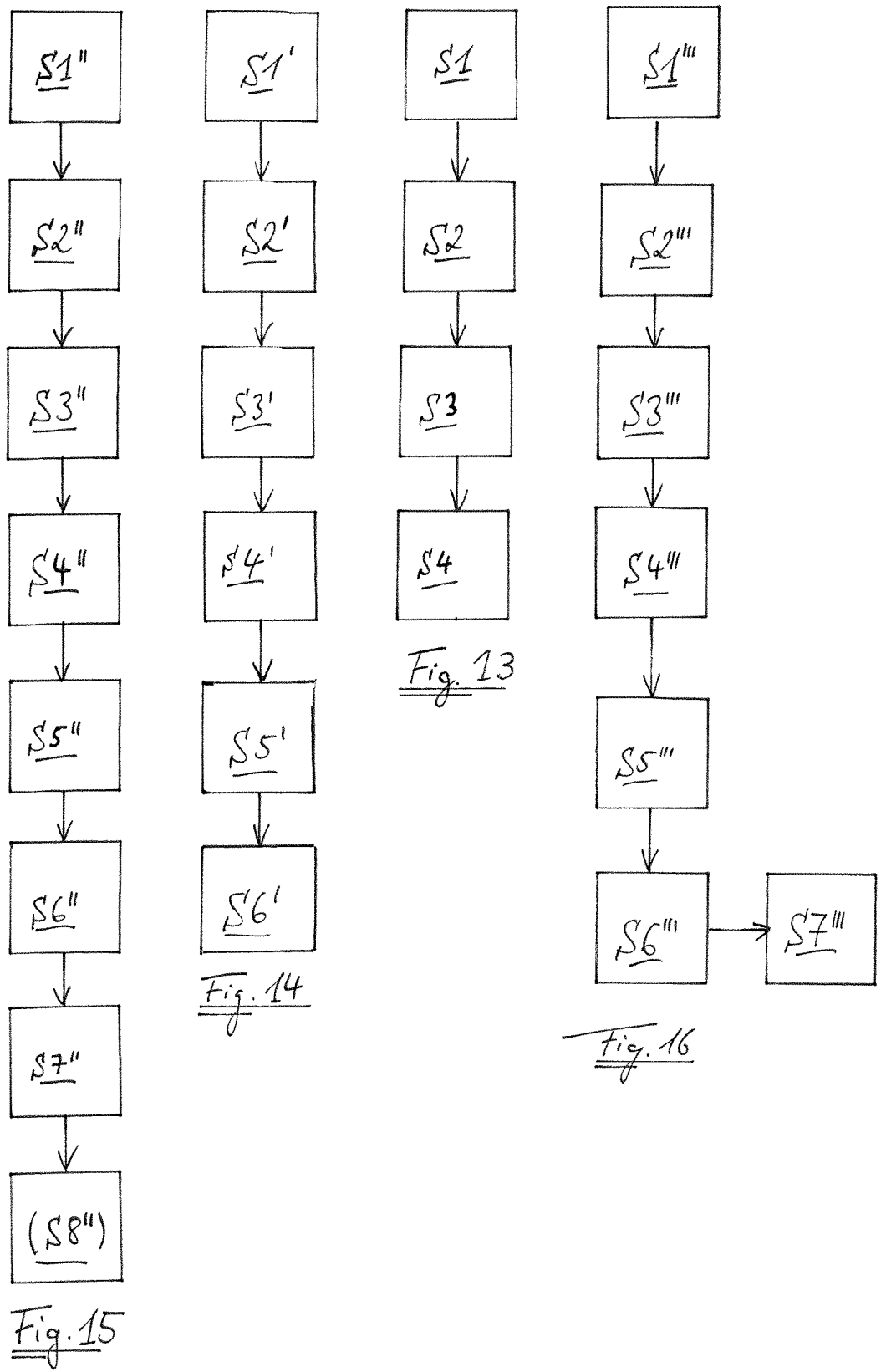

METHOD FOR INTEGRATING A BACKING-STRUCTURE ASSEMBLY IN A STRUCTURE OF AN AIRCRAFT OR SPACECRAFT

FIELD OF THE INVENTION

The present invention relates to integrating a backing-structure assembly, in particular a door-surrounding structure, in a structure of an aircraft or spacecraft, for example of an aeroplane.

Although the present invention can be applied to assemblies of various types, which can be used as part of or in backing structures of a structure of an aircraft or spacecraft, the present invention and the problem addressed thereby are to be described in greater detail below using the example of integrating a door-surrounding structure in an aeroplane structure.

BACKGROUND OF THE INVENTION

Door-surrounding structures are used in aeroplanes to reinforce and brace a fuselage skin in the region of a door cut-out which is introduced into the fuselage skin. When integrating a door-surrounding structure of this type in the structure of the aeroplane in a manner which is known to the applicant, the door-surrounding structure is composed of a multiplicity of individual components in accordance with a target geometry. A skin element for the fuselage skin supported by means of support posts, and clearances which result when joining the door-surrounding structure and the skin element due to manufacturing tolerances, are compensated in the procedure known to the applicant by means of compensation elements, what are known as shims. Instead of fixed compensation elements, what is known as liquid shim can be used.

When connecting a relatively large number of individual components in the course of integrating complex assemblies, it has proven to be relatively complex to adequately take into consideration the manufacturing tolerances resulting from the customised manufacture of the individual components.

BRIEF SUMMARY OF THE INVENTION

In view of the above, an idea of the invention is to simplify and improve the integration of a backing-structure assembly in a structure of an aircraft or spacecraft and in particular in this case to allow a considerably simpler but still reliable tolerance compensation.

Accordingly, a method for integrating a backing-structure assembly in a structure of an aircraft or spacecraft is proposed, wherein to form the backing-structure assembly, a plurality of individual elements are joined. The method comprises the steps of:
  providing the individual elements for the backing-structure assembly and providing a skin portion for the structure;
  arranging the elements on a pre-assembly device which comprises retaining devices, which are each configured to hold one of the elements so as to be adjustable with respect to the position and/or location thereof; and
  connecting some or all of the elements to the skin portion.

By adjusting the retaining devices for tolerance compensation, in this case, gaps between joint regions of the elements and the skin portion are eliminated or adjusted.

A structure of an aircraft or spacecraft is further proposed which comprises a backing-structure assembly which is integrated by means of such a method.

A concept on which the invention is based consists in the fact that the integration of a backing-structure assembly, for which a plurality of individual elements are to be assembled, in the structure can take place in a manner which is considerably simpler and has improved tolerance compensation when adjustable retaining devices are provided and, by means of the adjustability of the location and/or position of each of the elements, the joint gaps can be reduced as much as possible or can be made to disappear completely. The integration of the backing-structure assembly can thus be simplified, the costs can be lowered, and the quality of the structure obtained can be further improved.

In one embodiment, a geometry of the provided skin portion is measured three-dimensionally, for example by means of an optical measuring process, and the retaining devices are adjusted to the geometry of the skin portion using measurement data obtained from the three-dimensional measurement. In this way, a particularly precise and targeted adjustment of the retaining devices is accomplished.

In another embodiment, the elements for the backing-structure assembly are provided as elements formed by a fibre-composite material.

In another embodiment, the skin portion is provided as a skin portion formed by a fibre-composite material.

Especially in the case of fibre-composite elements, facilitated tolerance compensation as a result of manufacturing tolerances which are often greater by comparison with metal elements can be advantageous.

In one development, the fibre-composite material comprises a thermoplastic polymer matrix having reinforcement fibres embedded therein. The improved tolerance compensation can have an even more advantageous effect in the case of fibre-composite materials of this type due to the manufacturing tolerances to be expected.

In one development, at least some of the elements are connected to the skin portion by welding. Welded joints, for example thermoplastic welded joints, allow for example weight reductions with respect to other types of connections which require additional connecting elements. In addition, for example in the case of a welded connection produced by means of a thermoplastic polymer, the quality of the connection can expediently be ensured. Furthermore, drilling chips and drilling dust can be avoided.

In one development, when connecting by means of welding, the joint region of a least one of the elements is plastically adapted at least in some regions to the skin portion, for example for additional tolerance compensation. After adjusting the retaining device, any residual gaps still remaining can thus be closed in a time-saving and cost-saving manner without requiring compensation elements (what are known as shims).

In one embodiment, after arranging the elements, the pre-assembly device is taken into the immediate vicinity of the skin portion. In this case, the retaining devices are subsequently adjusted for tolerance compensation.

In one development of the aforementioned embodiment, it can be provided that the gaps are measured after positioning the pre-assembly device in the immediate vicinity of the skin portion, and the retaining devices are adjusted or readjusted on the basis of the measured gap widths.

In another development, it can additionally be provided that the retaining devices are provided so as to be freely movable on the pre-assembly device and are automatically oriented by contact of the element held by the retaining device in each case with the skin portion. In this way, the tolerance region is achieved very simply.

In one embodiment, the retaining devices are adjusted for tolerance compensation before the elements are arranged on the pre-assembly device. This can take place on the basis of the three-dimensional measurement of the geometry of the skin portion. The pre-assembly device is thus expediently already adjusted before the arrangement of the elements thereon for the assembly, which can have a favourable effect on the workflow.

In another embodiment, after adjusting the retaining devices, at least some of the elements for the backing-structure assembly are interconnected or tacked to one another before and/or whilst the connection to the skin portion is carried out. In this case, the connection or tacking of the elements to one another can take place by welding. Thus, some or all of the elements are already fixed to one another in full or at least in part and are fixed even better in the relative location thereof, in addition to the effect of the retaining devices. In addition, in some cases it can be expedient, for example, to improve the access to joint regions of the elements to one another, when the connection of the elements to one another takes place before the connection to the skin portion is produced.

In one embodiment, by adjusting the retaining devices for tolerance compensation, gaps between joint regions of at least some of the elements are further eliminated or adjusted. In this way, tolerance compensation between the elements of the backing-structure assembly can likewise be simplified, time and costs can be saved, and the quality of the finished structure can be further improved.

In one embodiment, after adjusting the retaining devices, at least some of the elements for the backing-structure assembly are interconnected or tacked to one another, for example by welding, before the pre-assembly device is taken into the immediate vicinity of the skin portion to connect some or all of the elements to the skin portion.

In another embodiment, by adjusting the retaining devices for tolerance compensation, a gap between a joint region of at least one of the elements and another backing-structure element of the structure is eliminated or adjusted. In this way, the tolerance compensation between elements of the backing-structure assembly and additional backing-structure elements can likewise be simplified.

In another embodiment of the invention, the backing-structure assembly is a door-surrounding structure. A door-surrounding structure of this type can also be referred to as a door-frame structure. In the case of a door-frame structure, which is used for example in the region of a door cut-out of an aeroplane, the facilitated compensation of manufacturing tolerances can have an even more advantageous effect in view of the mostly high number of individual parts.

In one development, as elements for the door-surrounding structure, at least one main frame and/or at least one auxiliary frame and/or at least one intercostal element or transverse strut and/or a beam and/or a ridge are provided.

In another embodiment, the skin portion is formed by a skin element of a fuselage shell or the skin portion is formed by a portion of a skin of a fuselage barrel which is closed in the circumferential direction.

In developments, the skin element can be curved in a two-dimensional or three-dimensional manner, that is to say can have a simple curvature in only one spatial direction or a curvature in a plurality of spatial directions.

In one embodiment, the aircraft or spacecraft is an aeroplane.

In embodiments of the invention, the welding can take place inductively or by means of ultrasound or by means of a laser or by surface contact with a heated body. The heated body can be a heated, rigid pressure piece, which can be heated by means of an electric resistance heater or by the passage of a heated fluid therethrough. Furthermore, the heated body can be a cushion filled with a heated fluid or a heated polymer cushion. Alternatively, welding by means of a heated roller comes into consideration.

During the welding, to achieve a high-quality welded connection, pressure can be exerted on the welding partner. For example, in this case the element or elements to be welded to the skin portion can be pressed in some regions against the skin portion.

In developments, the pre-assembly device can thus be equipped with one or more welding means, for example with an induction means or an ultrasound means or with a laser or a means for guiding and/or focusing a laser beam or with a fluid-filled cavity or a fluid-filled cushion or with a heatable polymer cushion or with a heatable roller.

In developments, the retaining devices and/or the welding means can be configured to be changeable for adaptation to changing geometries of the elements and/or of the skin portion. As a result, an even more flexible and versatile use of the pre-assembly device is possible.

According to embodiments of the invention, as the thermoplastic polymer material, a high-performance thermoplastic is used, for example a polyaryletherketone (PAEK), a polyether ether ketone (PEEK), or the like. As reinforcement fibres, carbon fibres, glass fibres or other suitable fibres or combinations thereof can be embedded in a matrix formed by the thermoplastic polymer material, for example as what are known as continuous or endless fibres. The provided welding means can be configured for welding by melting and/or fusing a thermoplastic polymer matrix, which can be formed by a high-performance thermoplastic of this type.

The configurations and developments above can be combined with one another as desired where appropriate. Further possible configurations, developments and implementations of the invention also do not comprise explicitly mentioned combinations of features of the invention described previously or in the following with respect to the embodiments. In particular, in the process a person skilled in the art will also add individual aspects as improvements or additions to the respective basic form of the present invention.

BRIEF DESCRIPTION OF THE DRAWINGS

The present invention will be described in greater detail below on the basis of the embodiments shown in the schematic drawings, in which:

FIG. 3 is a schematic illustration of applying portions of a semi-finished product to a female tool part of a press moulding tool comprising a curved shaping surface for producing a skin element for a fuselage shell;

FIG. 6A is a schematic section A-A, as indicated in FIG. 6;

FIG. 6B-E are schematic views of examples of welding means;

FIG. 13 is a flowchart of a method according to a first embodiment;

FIG. 14 is a flowchart of a method according to a second embodiment;

FIG. 15 is a flowchart of a method according to a third embodiment; and

FIG. 16 is a flowchart of a method according to a fourth embodiment.

Figure 1:
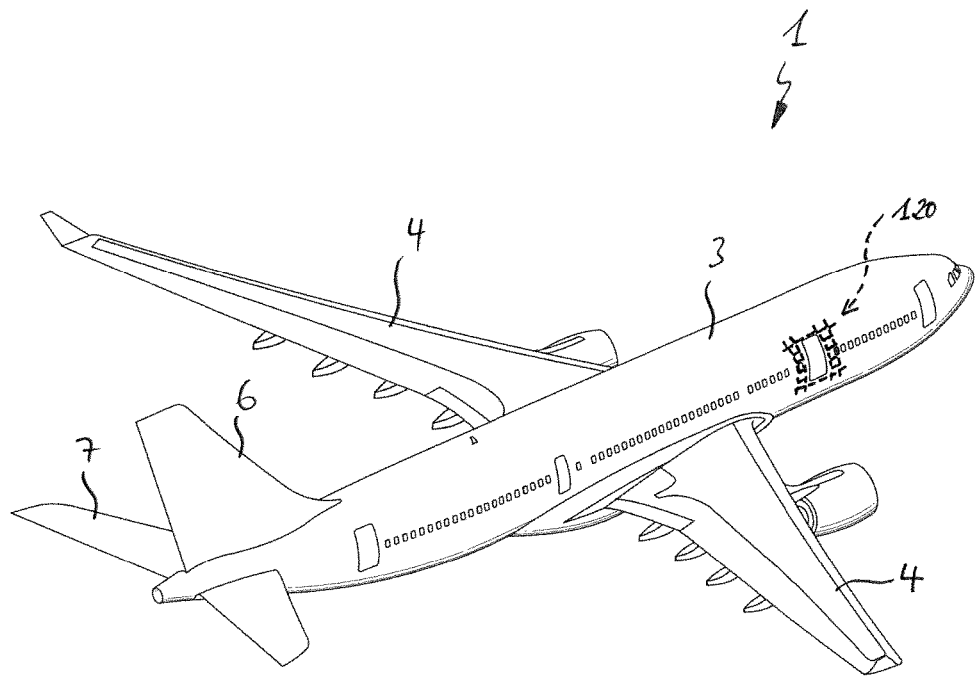
FIGS. 1 and 2 show an aeroplane as an example of an aircraft or spacecraft, in the production of which a method according to embodiments of the invention can be used.

The accompanying drawings are intended to facilitate further understanding of the embodiments of the present invention. They illustrate embodiments and are used, in conjunction with the description, to explain principles and concepts of the invention. Other embodiments and many of the above-mentioned advantages emerge from the drawings. The elements of the drawings are not necessarily shown to scale with respect to one another.

In the drawings, elements, features and components which are like, functionally like or have the same effect—unless otherwise specified—are each provided with the same reference numerals.

DETAILED DESCRIPTION

Figure 2:
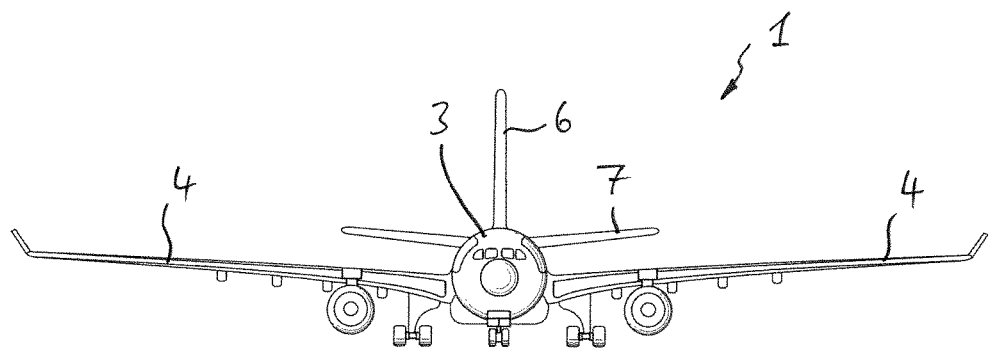

FIGS. 1 and 2 show an aeroplane 1 as an example of an aircraft or spacecraft, in the structure of which a backing-structure assembly 120 according to the embodiments described below can be integrated. In FIGS. 1 and 2, a fuselage 3 of the aeroplane 1, as well as aerofoils 4 and tail units 6 and 7, are shown by way of example. FIG. 1 further shows by way of example the backing-structure assembly 120, which is what is known as a door-surrounding structure or door-frame structure. It is understood that the fuselage 3 can be divided up into shell components in different ways in the longitudinal and circumferential directions, or that fuselage barrels joined to the fuselage 3 can be designed to be completely closed and continuous in the circumferential direction.

FIG. 3 is a schematic view of applying portions (not shown in greater detail in FIG. 3) of a semi-finished product which comprises a thermoplastic polymer material for forming a matrix and reinforcement fibres for embedding in the matrix, to a shaping surface 29 of a female, outer tool part 28 of a press moulding tool which is shown at the bottom of FIG. 3. By means of the application, a semi-finished product arrangement 31 is formed, from which a skin element is then produced, which in turn is intended to form a skin portion for a fuselage shell of the aeroplane 1. The shaping surface 29 is curved in FIG. 3, for example is approximately semi-cylindrical, but instead of being curved in only one direction, can alternatively be curved in a plurality of directions in order to produce shell skin elements which are curved once or multiple times.

As a semi-finished product, for example a preconsolidated semi-finished product comprising a thermoplastic matrix material and reinforcement fibres or a non-preconsolidated semi-finished product, in which the thermoplastic material and the fibres are merely tacked, can be used.

The semi-finished product portions can be applied in an automated manner to the shaping surface 29 as what are known as tapes. In FIG. 3, the application of the tapes by means of a device 15 for applying tape in an automated manner, which device can also be referred to as an automated tape-laying machine or ATL machine and comprises a suitable laying head 15a, is shown schematically. FIG. 3 also shows that in addition or as an alternative to applying fibre tapes by means of automated tape laying, an application of for example relatively narrow tapes can take place by means of the process of automated fibre placement or AFP, which can prove to be advantageous in particular in the case of shaping surfaces 29 having complex curvatures, for example for forming a shell skin having a double curvature. FIG. 3 is an additional schematic view of a suitable device 16, for example as an AFP machine and is equipped with a means 16a for depositing the tapes. The semi-finished product portions are thus deposited in an efficient manner directly on the shaping surface 29 of the female tool part 28, which is later used as an outer moulding tool part for consolidating and press moulding the skin element. During the application of the portions of the semi-finished product, merely a local consolidation takes place, as a result of which the semi-finished product portions are tacked locally and thus fixed to one another to hold said portions in position. The merely local consolidation during the depositing makes it possible to deposit the semi-finished product portions at a higher speed. The preprepared semi-finished product arrangement 31 is thus already present in the shaping tool part 28 for subsequent consolidation by press moulding.

According to a variant which is not shown in detail in the drawings but is likewise advantageous, the semi-finished product arrangement 31 can alternatively be formed in such a manner that portions of the semi-finished product in the form of what are known as tailored blanks, that is to say prefabricated blanks, which are provided for example ready cut by a semi-finished product supplier, are firstly applied in a planar manner to a planar table. In this variant, a two-dimensional semi-finished product arrangement is thus firstly formed by arranging the portions of the semi-finished product. Said arrangement can then be inserted in the tool part 28 as a semi-finished product arrangement 31 and thus brought into the desired three-dimensional shape. So that the semi-finished product portions do not shift in this case, said portions can be tacked during the application to the table, for example by local consolidation or local heating. Thus, in this variant, a two-dimensional application of blanks can be combined with a three-dimensional press moulding, which can be useful in particular for producing for example fuselage shells for cylindrical fuselage sections. In this case, the increased temperature, which is applied to the semi-finished product arrangement 31 during the press moulding, can be high enough, for example above the melting temperature of the thermoplastic polymer material, that the fibres can move relative to one another for the deformation into the three-dimensional final shape.

Figure 4:
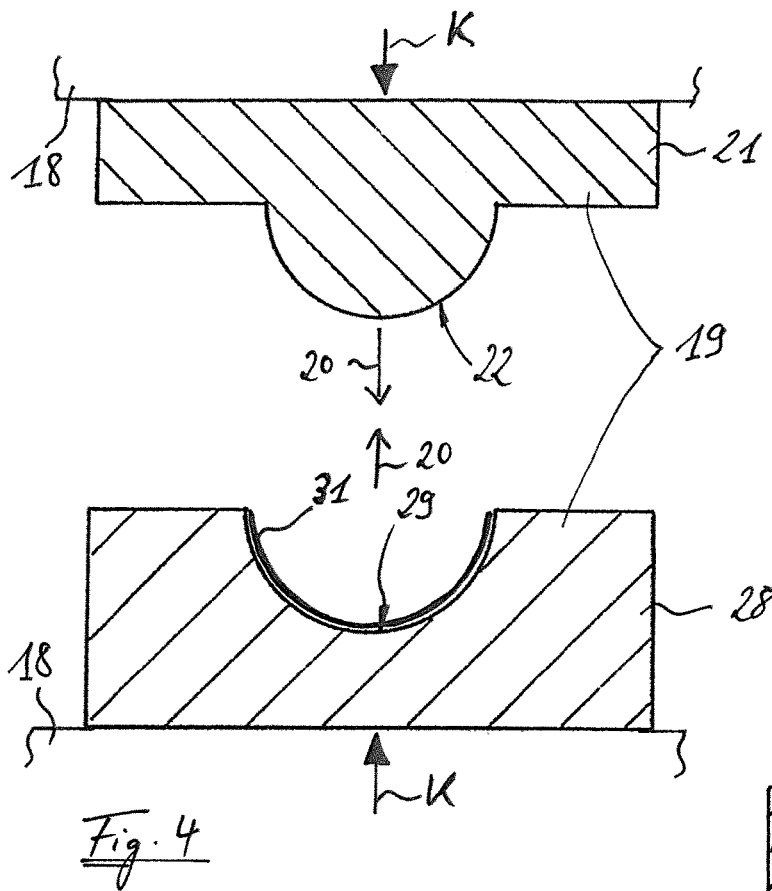
FIGS. 4 and 5 are schematic illustrations of the production of a skin element for a fuselage shell by press moulding in a press moulding tool comprising two tool parts.
Figure 5A:
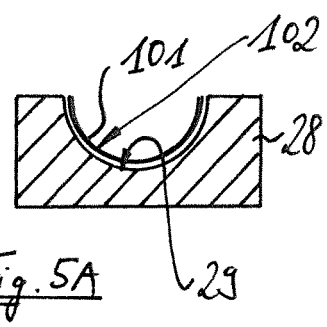
FIG. 5A shows a consolidated skin element for a fuselage shell, produced in accordance with a method as illustrated in FIGS. 3 to 5.
Figure 5:
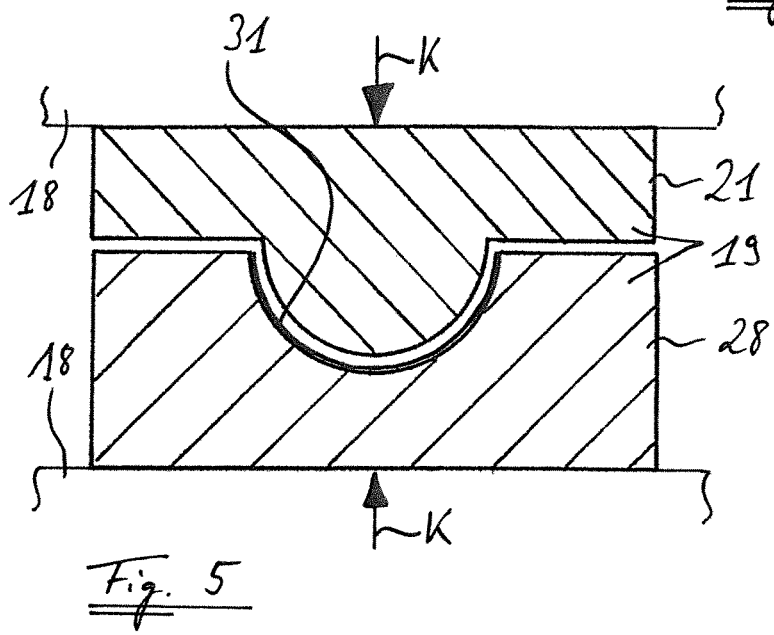

In order to produce a skin element, the semi-finished product arrangement 31 is globally consolidated by applying increased temperature and pressure; see FIGS. 4 and 5. In this case, the female, lower tool part 28 forms a component of a press moulding tool 19, which additionally comprises an upper, male tool part 21. For the application of the compression forces for consolidation on the semi-finished product arrangement 31, between the surface 29 and a surface 22 of the male tool part 21 facing said surface, an additional element for transmitting pressure and optionally for contour compensation can be provided, which, for the sake of a better overview, however, is not shown in detail in FIGS. 4 and 5. As shown in FIGS. 4 and 5, the tool parts 21 and 28 can be moved together relative to one another, as indicated in FIGS. 4 and 5 by arrows for illustrating the relative movement 20. It is understood that, in this case, both tool parts 21, 28 can be moved, or only one of said parts, whilst the other is provided to be stationary. For example, the tool part 28 can be a stationary tool part. The tool parts 21, 28 can further be pressed against one another by a force K, in order to apply the pressure to the semi-finished product arrangement 31, in which for example a press comprising suitable press jaws 18 (in FIGS. 4 and 5, indicated only in some portions) is used.

After carrying out a press moulding process of this type from FIGS. 4 and 5 and opening the press moulding tool 19 by taking out the upper tool part 21, in the lower, female tool part 28, there is a consolidated skin element 101; see also FIG. 5A.

In the embodiments described below, the backing-structure assembly 120 is integrated in a fuselage shell as part of the structure of the aeroplane 1. In such embodiments, the production of a consolidated skin element 101 in the female tool part 28 takes place in the manner described above with reference to FIG. 3-5, wherein the skin element 101 forms a skin portion 151 of the fuselage shell. In such embodiments, the skin element 101 can remain in the female tool part 28 during the integration of the backing-structure assembly 120.

Figure 6:
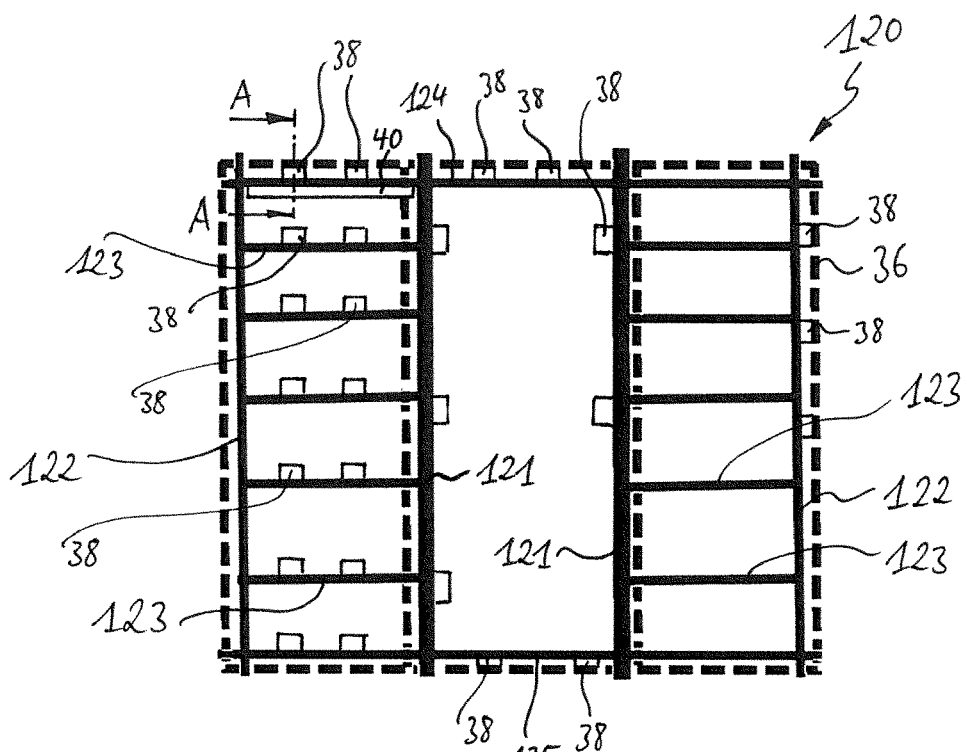
FIG. 6 is a schematic view of a door-surrounding structure and a pre-assembly device.

FIG. 6 is a schematic view of a backing-structure assembly 120 in the form of a door-surrounding structure, which, according to embodiments of the present invention, is integrated in a fuselage shell as part of an aeroplane structure. The door-surrounding structure 120 contains, in the construction shown, which is for example differentiated at least in part, two main or door frames 121, two auxiliary frames 122, a plurality of intercostal elements 123 (what are known as intercostals) and an upper beam 124 and a ridge 125. The beam 124 and the ridge 125 are also often referred to as sills. All the elements 121, 122, 123, 124, 125 are produced as fibre-composite components comprising a thermoplastic matrix and reinforcement fibres. At least some of the elements 121-125 are welded to the skin element 101, which forms a skin portion 151 of the fuselage shell and can be connected, for example by fusing, already to some portions of the stringers and/or frames, by melting and/or fusing and subsequent resolidification of the thermoplastic polymer material, as described below. The elements 121-125 can be produced in advance for example by press moulding and each have an open cross section, for example a C-shaped cross section or a Z-shaped cross section.

To form the door-surrounding structure 120, firstly the elements 121-125 which are provided as individual components are to be interconnected, and secondly the elements 121-125 are each to be connected at least to the skin portion 151 for integration in the aeroplane structure. It can additionally be provided to mechanically connect some of the elements 121-125 additionally to frames which are already in place, for example likewise by means of welded joints.

In order to connect the elements 121-125 of the door-frame structure 120 to the skin portion 151 by welding, a pre-assembly device 36 is provided; see FIG. 6. The pre-assembly device 36, shown schematically by dashed lines in FIG. 6, makes it possible to hold each of the individual elements 121-125 in the desired relative position to one another and to adjust the positions and locations of the individual elements 121-125 relative to one another. For this purpose, the pre-assembly device 36 comprises a multiplicity of retaining devices 38, which are each configured to hold one of the elements 121-125 so as to be adjustable with respect to position and/or location. This can, as shown schematically and by way of example in FIG. 6A, take place by means of suitable clamping devices 39, which move relative to a basic body of the pre-assembly device 36 in one or more spatial directions and can be rotated about one or more spatial directions. The corresponding adjustability is indicated in FIG. 6A schematically and by way of example by arrows, wherein only some of the possible movement capabilities are shown.

The pre-assembly device 36 is further equipped with welding means 40, of which only one is shown by way of example in FIG. 6. See also FIG. 6A. The welding means 40 are configured in particular for welding the elements 121-125 to one another and for welding the elements 121-125 to the skin portion 151, and are arranged in such a way that said means can carry out the welding function even if a tolerance compensation between the skin portion 151 and the respective elements 121-125 or individual elements 121-125 to one another takes place by means of the retaining devices 38. The welding means 40 in FIG. 6A is for example configured to weld the beam 124 (sill) to the skin portion 151. Welding means can also be provided for welding some of the elements 121-125 for example to an adjacent frame.

The welding means 40 can be configured in a different manner and can comprise for example an induction means 41 or an ultrasound means 41, or a laser or a means for guiding and/or focusing a laser beam; see for example FIG. 6B. Alternatively, it can be provided that, by means of the welding means 40, the welding takes place by means of surface contact with a heated body. The heated body can be a heated, rigid pressure piece 42, which is heated in particular by means of an electric resistance heater or by the passage of a heated fluid therethrough by means of channels 43 in the pressure piece 42; see FIG. 6C. Furthermore, the heated body can be a cushion 45 filled with a heated fluid or a heated, resilient polymer cushion 44; see FIGS. 6E and 6D. Alternatively, welding by means of a heated roller (not shown in the drawings) comes into consideration. For welding processes of the elements 121-125 to one another, for example welding means 40 in the form of welding clamps can be provided.

Alternatively, however, it can likewise be provided that the pre-assembly device 36 is configured without welding means or is equipped only with some welding means 40, for example only for the connection of the elements 121-125 to the skin portion 151. To carry out all or the remaining weldings, in such a variant, for example a robot comprising a suitable welding means, corresponding to the embodiments of the integration processes described in greater detail below, can carry out tack weldings and/or completely stable weldings between the positioned elements 121-125 and/or the elements 121-125 and the skin portion 151.

In a method according to a first embodiment, which is shown schematically in FIG. 13, it is provided that the pre-assembly device 36 holds the elements 121-125 in a manner which is not completely rigid, but rather with a certain degree of free movability for compensating tolerances relative to one another and to the skin portion 151.

In a step S1, the skin portion 151 and the individual elements 121 to 125 are provided.

In a step S2, the elements 121 to 125 are arranged on the pre-assembly device 36 in such a way that said elements are held by means of the retaining devices 38.

In a step S3, the pre-assembly device 36 is taken, for example by means of a manipulation device 78, which can be for example a multi-axle robot (see FIG. 8), into the immediate vicinity of the skin portion 151. Some or all of the elements 121-125 in this case make contact with the skin portion 151 for connection, as a result of which the elements 121-125 automatically adjust in terms of the relative position and optionally relative location thereof due to the free movability of the retaining devices 38 in accordance with the current actual dimensions and dimensional differences. In this way, clearances are kept as small as possible. The pre-assembly device 36 thus makes it possible to adapt the movably pre-assembled backing-structure assembly 120 to the skin portion 151 as well as possible. A gap S, which is thus eliminated or set to be as small as possible between a joint region 129 of the element 124 and the skin portion 151 for tolerance compensation, is shown by way of example in FIG. 6A.

In a step S4, the elements 121-125 are connected to the skin portion 151 and to one another by welding by the welding means 40 to form thermoplastic welded joints. In this step, connections of some of the elements 121-125 to further backing-structure elements, which are already connected to the skin portion, for example frames 110, can additionally be produced. The frames 110 are then likewise formed by a thermoplastic fibre-composite material, and the connections can likewise be in the form of for example welded joints.

Figure 8:
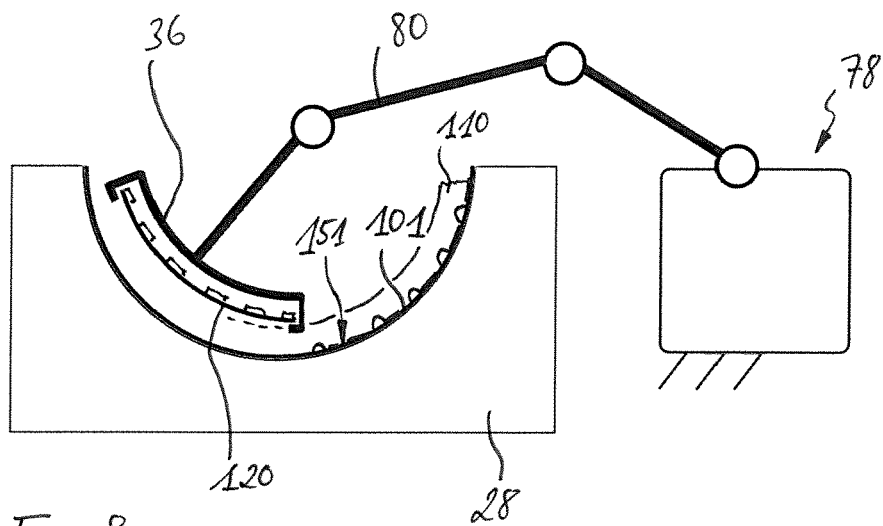
FIG. 8 shows an arrangement comprising a manipulation device, the pre-assembly device from FIG. 6, a door-surrounding structure held by said pre-assembly device, and a female tool part comprising a skin element received therein as a component of a fuselage shell, during the integration of the door-surrounding structure in a fuselage shell.

Whilst the steps S1 to S4 are carried out, the skin portion 151, which is formed from the skin element 101, wherein optionally additional components, which are indicated in FIG. 8 only schematically by an additional frame 110, can already be connected to the skin element 101, remains in the female tool part 28. A counter pressure for welding the elements 121-125 to the skin portion 151 is thus provided by the tool part 28.

It is noted that some of the elements 121-125 can be connected at least in some regions to the skin portion 151 and/or the frame 110 in a manner other than by welding. In particular in highly stressed regions of the backing-structure assembly 120, such a connection can alternatively or additionally take place by rivets or pins. Rivets or pins can thus be used, additionally or alternatively to welding, in particular in regions having particularly high mechanical loading, for example to connect the main frame 121 to the skin portion 151.

In the first embodiment in FIG. 13, the welding of the elements 121-125 takes place at the same time as forming the welded joints to the skin portion 151. For this purpose, the pre-assembly device 36 is equipped with suitable welding means 40. At the same time as welding the elements 121-125 to the skin portion 151 and to one another, the welding of some of the elements 121-125 to adjacent frames 110, which are already welded to the skin element 151, can additionally take place.

A method according to a second embodiment is shown schematically in FIG. 14.

In a step S1', the skin portion 151 and the individual elements 121 to 125 are provided.

Figure 7:
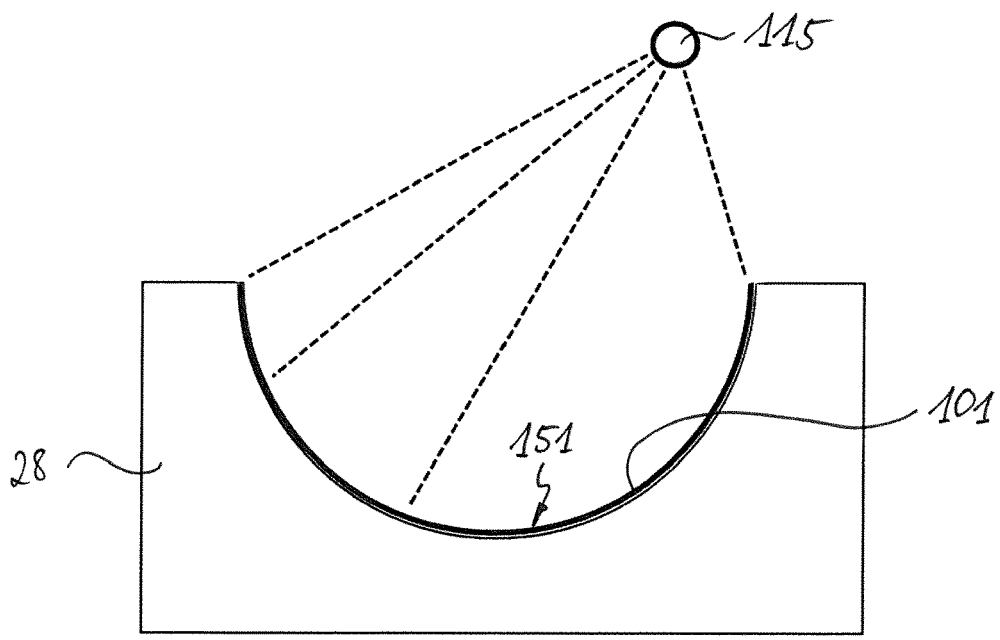
FIG. 7 is a schematic view of an optical measurement of an internal geometry of a consolidated skin element.

In a step S2', as shown schematically in FIG. 7, the internal geometry of the skin portion 151 (what is known as the inner mould line or ILM), which remains in the female tool part 28 after the consolidation of the skin element 101 and during any assembly of additional components, is measured three-dimensionally, for example by means of an optical measuring means 115.

In a step S3', the main frame 121 and the additional elements 122-125, namely the auxiliary frame 122, the intercostal elements 123 (intercostals) as well as the beam 124 and the ridge 125 (sills) are arranged on the pre-assembly device 36 and positioned and oriented by means of the retaining devices 38 with reference to the measurement data obtained from the three-dimensional measurement of the geometry of the skin portion 151.

After the completion of the step S3', the elements 121 to 125 of the backing-structure assembly 120 are thus stretched on the pre-assembly device 36 and readjusted with respect to the position and location thereof for tolerance compensation on the basis of the optical measurement of the skin portion 151. Before the pre-assembly device 36 is taken into the assembly position on the skin portion 151, the elements 121-125 are thus positioned and oriented relative to one another in such a way that said elements adapt to a desired region on the inner surface of the skin portion 151 with the smallest possible clearances.

In a step S4', the pre-assembly device 36 is received by means of the manipulation device 78 and transported, together with the backing-structure 120 which is located on the pre-assembly device 36 and adjusted, into the immediate vicinity of the skin portion 151. The backing-structure assembly 120, which is in the form of a door-surrounding structure, is positioned in the desired manner with respect to the skin portion 151, and the joint regions 129 of the elements 129 which are provided for this purpose are brought into abutment with the skin portion 151 as far as possible.

In a step S5', an additional readjustment of the positions and/or locations of the elements 121-125 takes place on the basis of the result of the three-dimensional measurement carried out in step S2' and additional measurements of the gaps S actually present when the backing-structure assembly 120 is positioned in the assembly position thereof relative to the skin portion 151. If required, the elements 121-125 are thus adjusted with respect to position and location once more according to the clearances actually observed.

In a step S6', the elements 121-125 are welded in the joint regions 129 to the skin portion 151. When welding the elements 121-125 to the skin portion 151, provided that residual gaps still remain between joint regions 129 and the skin portion 151, a plastic adaptation, at least in some regions, of the joint region 129, which is heated and thus melted for welding, to the skin portion 151 can be carried out for additional tolerance compensation. In the step S5', additional connections to other backing-structure elements such as in particular frames, which have already been connected to the skin portion 151 beforehand for example by welding, are additionally produced. An additional frame 110 is shown schematically purely by way of example in FIG. 8. Also when connecting one of the elements 121-125 for example to the frame 110, in the manner described above, a tolerance compensation can be carried out, and residual gaps can likewise be compensated by plastic adaptation of a joint region of each element 121-125 which is provided for connection to the frame 110.

Also whilst carrying out the steps S1' to S7', the skin portion 151, which is formed from the skin element 101, can remain in the female tool part 28, and makes it possible, for welding the elements 121-125 to the skin portion 151, to apply a counter pressure when pressing the elements 121-125 onto the skin portion 151.

FIG. 15 is a schematic view of a method according to a third embodiment.

In a step S1", the skin portion 151 and the individual elements 121 to 125 are provided.

In a step S2", as shown schematically in FIG. 7, the internal geometry of the skin portion 151, which remains in the female tool part 28 after the consolidation of the skin element 101 and during any assembly of additional components, is in turn measured three-dimensionally, for example by means of the optical measuring means 115.

In a step S3", the main frame 121 is arranged on the pre-assembly device 36 and, by means of the retaining devices 38, using the measurement data obtained from the three-dimensional measurement of the geometry of the skin portion 151, is positioned and oriented in a precise manner.

In a step S4", the additional elements 122-125, namely the auxiliary frame 122, the intercostal elements 123 (intercostals) as well as the beam 124 and the ridge 125 (sills) are arranged on the pre-assembly device 36 and likewise positioned and oriented with reference to the measurement data obtained from the three-dimensional measurement of the geometry of the skin portion 151.

In a step S5", the elements 121-125, which are positioned on the pre-assembly device 36, are completely welded to one another in the provided joint regions. In an alternative variant, in the step S5", the elements 121-125 or at least some thereof can be tacked to one another merely for example by spot welding. In this step, however, it would also be conceivable to connect or tack the elements to one another by means of rivets or pins.

In a step S6", the pre-assembly device 36 is received by means of the manipulation device 78 and transported, together with the backing-structure 120 which is located on the pre-assembly device 36, and welded or at least tacked within itself, into the immediate vicinity of the skin portion 151. The backing-structure assembly 120, which is in the form of a door-surrounding structure, is positioned in the desired manner with respect to the skin portion 151, and the joint regions 129 of the elements 129 which are provided for this purpose are brought into abutment with the skin portion 151.

In a step S7", the elements 121-125 are welded in the joint regions 129 to the skin portion 151. When welding the elements 121-125 to the skin portion 151, provided that residual gaps still remain between joint regions 129 and the skin portion 151, a plastic adaptation, at least in some regions, of the joint region 129, which is heated and thus melted for welding, to the skin portion 151 can be carried out for additional tolerance compensation. Furthermore, in the step S7", additional connections to other backing-structure elements such as in particular frames 110, which have already been connected to the skin portion 151 beforehand for example by welding, are additionally produced. Also when connecting one of the elements 121-125 for example to the frame 110, in the manner described above, a tolerance compensation can be carried out. Residual gaps can likewise be compensated by plastic adaptation of a joint region which is provided for connection to the frame 110. If the elements 121-125 have merely been tacked to one another, the final connections can likewise be produced in the step S7", or in an additional subsequent step, for example by welding.

In an optional step S8", in one or more of the regions, in which some of the elements 121-125 are connected to the skin portion 151, additionally or alternatively for example riveting or bolting of elements 121-125 to the skin portion 151 can take place, in particular in highly stressed regions such as in the region of the connection of the main frame 121 to the skin portion 151. Less heavily loaded connections of elements 121-125 to the skin portion 151 can be formed solely by welding, whereas in highly stressed regions, rivet or bolt connections or a combination of a welded joint and a rivet or bolt connection are possible.

Also whilst carrying out the steps S1" to S7", the skin portion 151, which is formed from the skin element 101, can remain in the female tool part 28, and makes it possible, for welding the elements 121-125 to the skin portion 151, to apply a counter pressure when pressing the elements 121-125 onto the skin portion 151.

FIG. 16 is a schematic view of a method according to a fourth embodiment.

In a step S1''', the skin portion 151 and the individual elements 121 to 125 are provided.

In a step S2''', as shown schematically in FIG. 7, the internal geometry of the skin portion 151, which remains in the female tool part 28 after the consolidation of the skin element 101 and during any assembly of additional components, is in turn measured three-dimensionally, for example by means of the optical measuring means 115.

In a step S3''', the retaining devices 38 are adjusted appropriately using the measurement data obtained from the three-dimensional measurement of the geometry of the skin portion 151, wherein the elements 121-125 are not yet arranged on the pre-assembly device 36.

In a step S4''', the elements 121-125 are arranged on the pre-assembly device 36 and stretched by means of the preadjusted retaining devices 38.

In a step S5''', the elements 121-125, which are positioned on the preadjusted pre-assembly device 36, are welded to one another by spot welding in the provided joint regions. In an alternative variant, in the step S5", the elements 121-125 or at least some thereof can be completely welded to one another. In the step S5''', it would also be conceivable to alternatively or additionally connect or tack the elements to one another by means of rivets or pins.

In a step S6''', the pre-assembly device 36 is transported by means of the manipulation device 78, together with the backing-structure 120 which is located on the pre-assembly device 36, and welded or at least tacked within itself, and thus pre-assembled, into the immediate vicinity of the skin portion 151. The backing-structure assembly 120, which is in the form of a door-surrounding structure, is positioned in the desired manner with respect to the skin portion 151, and the joint regions 129 of the elements 129 which are provided for this purpose are brought into abutment with the skin portion 151 as far as possible.

In a step S7''', the elements 121-125 are welded in the joint regions 129 to the skin portion 151. When welding the elements 121-125 to the skin portion 151, provided that residual gaps still remain between joint regions 129 and the skin portion 151, in the step S7''', a plastic adaptation, at least in some regions, of the joint region 129, which is heated and thus melted for welding, to the skin portion 151 can also be carried out for additional tolerance compensation. Furthermore, in the step S7''', additional connections to other backing-structure elements such as in particular frames, which have already been connected to the skin portion 151 beforehand for example by welding, are additionally produced. Residual gaps can also be compensated in this case by plastic adaptation of a joint region which is provided for connection to the frame 110.

Also when carrying out the steps S1''' to S7''', the skin portion 151, which is formed from the skin element 101, can remain in the female tool part 28. In addition, in the fourth embodiment, the step S8'' from FIG. 15 can also follow the step S7'''.

It is also noted that in the embodiments above, by adjusting the retaining devices 38, a tolerance compensation for joining the elements 121-125 to one another can also take place by adjusting the joint regions between the elements 121-125 to be connected in each case.

Figures 9, 10:
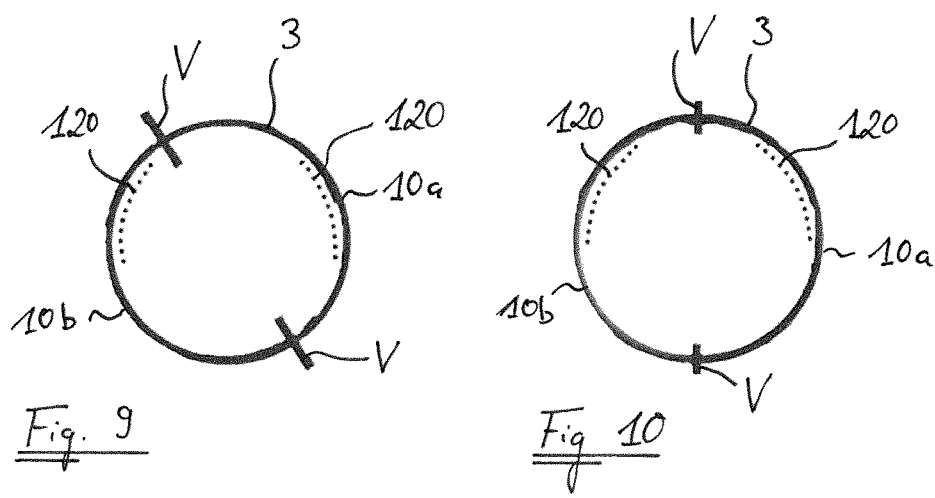
FIGS. 9 and 10 show two variants of the division of a fuselage into fuselage shells, in which positions of door-surrounding structures are indicated schematically.

In the embodiments described above, the door-surrounding structure 120 is integrated as a backing-structure assembly in a fuselage shell for the aeroplane 1, for example one of the fuselage shells 10a or 10b of the fuselage 3 which are shown schematically in FIGS. 9 and 10 and are in the form of half shells. In the finished fuselage 3, the fuselage shells 10a and 10b are rigidly connected, for example welded, to one another at connection points V. In FIGS. 9 and 10, it is shown schematically that the fuselage 3 can be divided into fuselage shells 10a, 10b in such a way that the door-surrounding structure does not pass beyond the connection points V. In the case of such a division of the fuselage 3, the door-surrounding structure 120 can already be integrated in the fuselage shell 10a and/or 10b before the fuselage shells 10a, 10b are joined. As described above, this can take place whilst the skin portion 151, to which additional components such as the frames 110 can already be welded, remains in the female tool part 28.

Figures 11, 12:
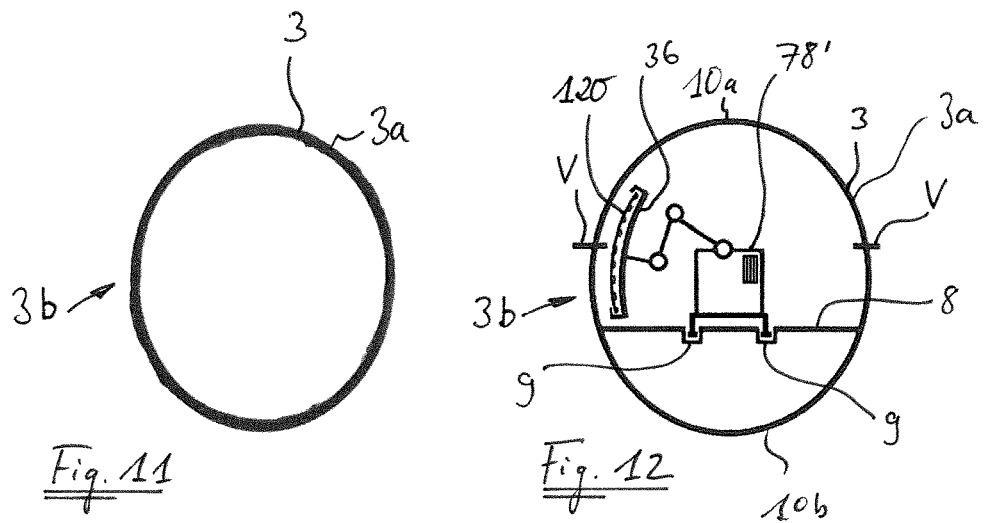
FIG. 11 is a schematic cross-sectional view of an oval, undivided fuselage.
FIG. 12 shows the integration of a door-surrounding structure in a fuselage structure having an oval cross section, in the case of a fuselage barrel which is already closed in the circumferential direction.

In variants of the embodiments of the invention described above, the door-surrounding structure 120 can be integrated in a closed fuselage barrel 3b. This is shown schematically in FIGS. 11 and 12. In FIG. 11, there is a fuselage 3 having an oval cross section and an undivided fuselage barrel 3b. In FIG. 12, by contrast, the fuselage 3 is divided into an upper half shell 10a and a lower half shell 10b, wherein the fuselage shells 10a, 10b have already been rigidly connected to the connection points V before the integration of the door-surrounding structure 120. In FIGS. 11 and 12, in each case, the skin portion, to which some or all of the elements 121-125 of the door-surrounding structure 120 are to be connected, is formed by a portion of a fuselage skin 3a which is already closed in the circumferential direction. In FIG. 12, each of the connection points V extends as a fuselage longitudinal seam through the region of a door-surrounding structure 120.

In the variants of FIGS. 11 and 12, the integration is carried out as in the above-described embodiments, wherein a suitably configured manipulation device 78' is provided, as shown by way of example in FIG. 12. In FIG. 12, the manipulation device 78' is configured to move on rail profiled parts, for example on seat rail profiled parts 9 in or on a floor 8 inside the fuselage 3, and can additionally be used for example to weld the fuselage shells 10a and 10b to one another along the connection points V before the integration of the door-surrounding structure 120.

In particular for use in methods according to the second to fourth embodiments and the variants thereof, the pre-assembly device 36 is configured to precisely adjust the position and location of individual elements 121-125 relative to one another according to the measurement carried out and to then be able to hold the elements 121-125 in the adjusted positions and orientations, in particular by means of suitably configured and arranged retaining devices 38.

By means of the ability to adjust the pre-assembly device 36, the clearances in all the described embodiments are advantageously minimised. Remaining gaps can be closed in the welding processes.

In the above-described embodiments, a doubler for the skin portion 151 can further be welded as a local, inner-face reinforcement structure to the skin element 151 before the connection or during the connection of the elements 121-125 to the skin portion 151, wherein the doubler can be used for example for thickening the skin in the region of a door cut-out. Alternatively, other components or assembly parts made of thermoplastic fibre-composite materials, which are not part of the backing-structure assembly 120, but which are likewise to be connected to the skin portion 151, could also be welded to the skin portion 151 before the connection or during the connection of the elements 121-125.

In all the above-described embodiments of the invention, a high-performance thermoplastic is used as the thermoplastic polymer material as the matrix for the skin element 101 and the skin portion 151 formed thereby for the elements 121, 122, 123, 124, 125 of the door-surrounding structure 120, the frame 110, as well as for optionally provided reinforcement elements which are in the form of doublers or the like. In this case, for example a polyaryletherketone (PAEK), a polyether ether ketone (PEEK) or the like is used. In the embodiments described above, the welding means 40 are configured for welding by melting and/or fusing a thermoplastic polymer matrix of this type. As reinforcement fibres, carbon fibres, glass fibres or other suitable fibres, or combinations thereof, are embedded in the thermoplastic polymer matrix.

If this is required or desired in some regions, in addition to the described welded joints, rivets or pins can be introduced into the welded region, but the thermoplastic welded joints can alternatively be provided without additional rivets or pins of this type. However, in particular when, before the integration of the backing-structure assembly, system components are arranged on the skin portion or on additional components of a backing structure for the skin portion, such as stringers or frames, the connections can be produced completely or as substantially as possible by welding in order to avoid drilling dust.

In particular in the case of the above-described embodiments in which the elements 121-125 are pre-assembled on the pre-assembly device 36 and are tacked to one another for this purpose or are already completely interconnected, the welding of the elements 121-125 of the pre-assembled backing-structure assembly 120, which is already adapted with respect to the tolerances, to the skin portion 151 can alternatively take place in such a manner that the joint regions, for example the joint region 129, of the elements 121-125 are heated by infrared radiation and sufficiently melted and then the complete backing-structure assembly 120 is pressed against the skin portion 151.

Although the present invention has been fully described above by means of several embodiments, it is not limited to the above, but may be modified in multiple ways.

For example, the present invention can be used not only in conjunction with fibre-composite elements and skin portions made of thermoplastic fibre-composite materials, but rather it can also be useful in cases in which the skin portion and/or the elements are formed by a fibre-composite material comprising a curable matrix or by a metal material. In addition, applications are also conceivable in which for elements and/or the skin portion, thermoplastic fibre-composite materials, curable fibre-composite materials and metal materials are combined in various combinations. If welded joints are not possible in the case of metal variants or material combinations of this type, other types of connection, such as rivet connections, can be used instead.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for integrating a door-surrounding structure in a structure of an aircraft or spacecraft, wherein to form the door-surrounding structure, a plurality of individual elements are joined, the plurality of individual elements comprising a first main frame, a second main frame, a first auxiliary frame, a second auxiliary frame, a plurality of intercostal elements, an upper sill and a lower sill, the method comprising the steps of:
providing the plurality of individual elements for the door-surrounding structure and providing a skin portion for the structure;
arranging the plurality of individual elements on a pre-assembly device which comprises retaining devices which are each configured to hold one of the elements so as to be adjustable with respect to the position thereof, wherein the arranging comprises:
arranging the first main frame and the second main frame spaced apart from one another on the pre-assembly device;
arranging the upper sill and the lower sill transverse to the first main frame and the second main frame on the pre-assembly device; and
arranging a first set of the plurality of intercostal elements on the pre-assembly device extending between the first main frame and the first auxiliary frame and a second set of the plurality of intercostal elements on the pre-assembly device extending between the second main frame and the second auxiliary frame; and
connecting some or all of the elements to the skin portion;
wherein, by adjusting the retaining devices for tolerance compensation, gaps between joint regions of the elements and the skin portion can be eliminated or adjusted.

2. The method of claim 1, wherein a geometry of the provided skin portion is measured three-dimensionally, and wherein the retaining devices are adjusted to the geometry of the skin portion using measurement data obtained from the three-dimensional measurement.

3. The method of claim 2, wherein the geometry of the provided skin portion is measured by an optical measuring process.

4. The method of claim 1, wherein the elements for the door-surrounding structure are provided as elements made of a fibre-composite material.

5. The method of claim 4, wherein the fibre-composite material comprises a thermoplastic polymer matrix having reinforcement fibres embedded therein.

6. The method of claim 1, wherein the skin portion is provided as a skin portion made of a fibre-composite material.

7. The method of claim 6, wherein the fibre-composite material comprises a thermoplastic polymer matrix having reinforcement fibres embedded therein.

8. The method of claim 1, wherein the connection of at least some of the elements to the skin portion takes place by welding.

9. The method of claim 8, wherein, when connecting by welding, the joint region of at least one of the elements is plastically adapted at least in some regions to the skin portion.

10. The method of claim 9, wherein the joint region of at least one of the elements is plastically adapted for additional tolerance compensation.

11. The method of claim 1, wherein, after the arrangement of the elements, the pre-assembly device is taken into the immediate vicinity of the skin portion, and subsequently the retaining devices are adjusted for tolerance compensation.

12. The method of claim 1, wherein the retaining devices are adjusted for tolerance compensation before the elements are arranged on the pre-assembly device.

13. The method of claim 1, wherein, after adjusting the retaining devices, at least some of the elements for the door-surrounding structure are interconnected or tacked to one another.

14. The method of claim 13, wherein the elements for the door-surrounding structure are interconnected by welding before the connection to the skin portion is carried out.

15. The method of claim 13, wherein the elements for the door-surrounding structure are interconnected by welding whilst the connection to the skin portion is carried out.

16. The method of claim 1, wherein by adjusting the retaining devices for tolerance compensation, gaps between joint regions of at least some of the elements are further eliminated or adjusted.

17. The method of claim 1, wherein, after adjusting the retaining devices, at least some of the elements for the door-surrounding structure are interconnected or tacked to one another.

18. The method of claim 17, wherein the elements for the door-surrounding structure are interconnected by welding, before the pre-assembly device is taken into the immediate vicinity of the skin portion to connect some or all of the elements to the skin portion.

19. The method of claim 1, wherein the skin portion is formed by a skin element of a fuselage shell.

20. The method of claim 1, wherein the skin portion is formed by a portion of a skin of a fuselage barrel which is closed in the circumferential direction.

* * * * *